United States Patent
Sharma et al.

(10) Patent No.: US 11,507,474 B2
(45) Date of Patent: Nov. 22, 2022

(54) SYSTEM AND METHOD FOR A BACKUP AND RECOVERY OF APPLICATION USING CONTAINERIZED BACKUPS COMPRISING APPLICATION DATA AND APPLICATION DEPENDENCY INFORMATION

(71) Applicant: EMC IP Holding Company LLC, Hopkinton, MA (US)

(72) Inventors: Manish Sharma, Bangalore (IN); Aaditya Bansal, Bangalore (IN); Shelesh Chopra, Bangalore (IN); Sunil Yadav, Bangalore (IN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 77 days.

(21) Appl. No.: 16/886,549

(22) Filed: May 28, 2020

(65) Prior Publication Data
US 2021/0182156 A1 Jun. 17, 2021

(30) Foreign Application Priority Data
Dec. 16, 2019 (IN) .............................. 201941052138

(51) Int. Cl.
*G06F 3/06* (2006.01)
*G06F 11/14* (2006.01)
(Continued)

(52) U.S. Cl.
CPC .......... *G06F 11/1469* (2013.01); *G06F 3/061* (2013.01); *G06F 3/0644* (2013.01); *G06F 3/0655* (2013.01); *G06F 3/0671* (2013.01); *G06F 11/1448* (2013.01); *G06F 11/1451* (2013.01); *G06F 11/1461* (2013.01); *G06F 11/1464* (2013.01); *G06F 11/1658* (2013.01);
(Continued)

(58) Field of Classification Search
CPC .. G06F 11/1469; G06F 3/065; G06F 11/1451; G06F 11/2094; G06F 3/0655; G06F 3/0619; G06F 3/0644; G06F 3/067; G06F 11/3604; G06F 11/0772; G06F 11/1461; G06F 11/1464; G06F 11/1658; G06F 11/2023; G06F 16/137; G06F 11/1448; G06F 2201/835; G06F 3/061; G06F 3/0671
See application file for complete search history.

(56) References Cited

U.S. PATENT DOCUMENTS 7,418,619 B1 * 8/2008 Uhlmann ............ G06F 11/1469
714/E11.122
8,676,759 B1 3/2014 Zhu et al.
(Continued)

*Primary Examiner* — Chie Yew
(74) *Attorney, Agent, or Firm* — Chamberlain, Hrdlicka, White, Williams & Aughtry

(57) ABSTRACT

A method for performing a backup operation includes obtaining, by a backup agent, a backup request for a file system, and in response to the backup request: generating a first application partition for an application associated with the file system, performing a dependency analysis on the application to identify application dependency information, populating a first application partition with a copy of the application dependency information and a copy of application data associated with the application, and initiating a storage of a backup to a backup storage system, wherein the backup comprises the first application partition.

15 Claims, 7 Drawing Sheets

(51) Int. Cl.
  *G06F 16/13* (2019.01)
  *G06F 11/16* (2006.01)
  *G06F 11/20* (2006.01)

(52) U.S. Cl.
  CPC ........ *G06F 11/2023* (2013.01); *G06F 16/137* (2019.01); *G06F 2201/835* (2013.01)

(56) References Cited

U.S. PATENT DOCUMENTS

| | | |
|---|---|---|
| 8,909,980 B1 | 12/2014 | Lewis et al. |
| 9,003,143 B1 | 4/2015 | Barnes et al. |
| 10,567,500 B1 | 2/2020 | Leshinsky et al. |
| 11,132,331 B2 | 9/2021 | Singh et al. |
| 2008/0244204 A1 | 10/2008 | Cremelie |
| 2009/0199199 A1 | 8/2009 | Pooni et al. |
| 2013/0110783 A1 | 5/2013 | Wertheimer et al. |
| 2014/0214768 A1 | 7/2014 | Lillibridge et al. |
| 2017/0011049 A1 | 1/2017 | Venkatesh et al. |
| 2017/0177867 A1 | 6/2017 | Crofton |
| 2017/0180394 A1 | 6/2017 | Crofton et al. |
| 2018/0285199 A1* | 10/2018 | Mitkar ................ G06F 11/1451 |
| 2020/0104202 A1 | 4/2020 | Stupak et al. |
| 2020/0125449 A1 | 4/2020 | Mao et al. |
| 2021/0149769 A1* | 5/2021 | Balcha ................ G06F 11/1451 |
| 2021/0149772 A1 | 5/2021 | Zatsepin et al. |

\* cited by examiner

SYSTEM AND METHOD FOR A BACKUP AND RECOVERY OF APPLICATION USING CONTAINERIZED BACKUPS COMPRISING APPLICATION DATA AND APPLICATION DEPENDENCY INFORMATION

CROSS-REFERENCE TO RELATED APPLICATION

This application claims priority to Indian Patent Application No. 201941052138, filed Dec. 16, 2019, which incorporated by reference herein in its entirety.

BACKGROUND

Computing devices may include any number of internal components such as processors, memory, and persistent storage. Each of the internal components of a computing device may be used to generate data and to execute functions. The process of generating, storing, and sending data may utilize computing resources of the computing devices such as processing and storage. The utilization of the aforementioned computing resources to generate data and to send data to other computing devices may impact the overall performance of the computing resources.

SUMMARY

In general, in one aspect, the invention relates to a method for performing backup operations. The method includes obtaining, by a backup agent, a backup request for a file system, and in response to the backup request: generating a first application partition for an application associated with the file system, performing a dependency analysis on the application to identify application dependency information, populating a first application partition with a copy of the application dependency information and a copy of application data associated with the application, and initiating a storage of a backup to a backup storage system, wherein the backup comprises the first application partition.

In general, in one aspect, the invention relates to a system that includes a processor and memory that includes instructions which, when executed by the processor, perform a method. The method includes obtaining, by a backup agent, a backup request for a file system, and in response to the backup request: generating a first application partition for an application associated with the file system, performing a dependency analysis on the application to identify application dependency information, populating a first application partition with a copy of the application dependency information and a copy of application data associated with the application, and initiating a storage of a backup to a backup storage system, wherein the backup comprises the first application partition.

In general, in one aspect, the invention relates to a non-transitory computer readable medium that includes computer readable program code, which when executed by a computer processor enables the computer processor to perform a method for performing backup operations. The method includes obtaining, by a backup agent, a backup request for a file system, and in response to the backup request: generating a first application partition for an application associated with the file system, performing a dependency analysis on the application to identify application dependency information, populating a first application partition with a copy of the application dependency information and a copy of application data associated with the application, and initiating a storage of a backup to a backup storage system, wherein the backup comprises the first application partition.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

DETAILED DESCRIPTION

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

In general, one or more embodiments of the invention relates to systems and methods for generating backups of applications in a production host environment. The backups may include application partitions. Each application partition may each include the application data of an application in addition to any dependency information that enables the application to be restored in a second production host (or a second production host environment) without needing any previously-installed code or previously-installed instructions in the second production host (or production host environment).

Figure 1:
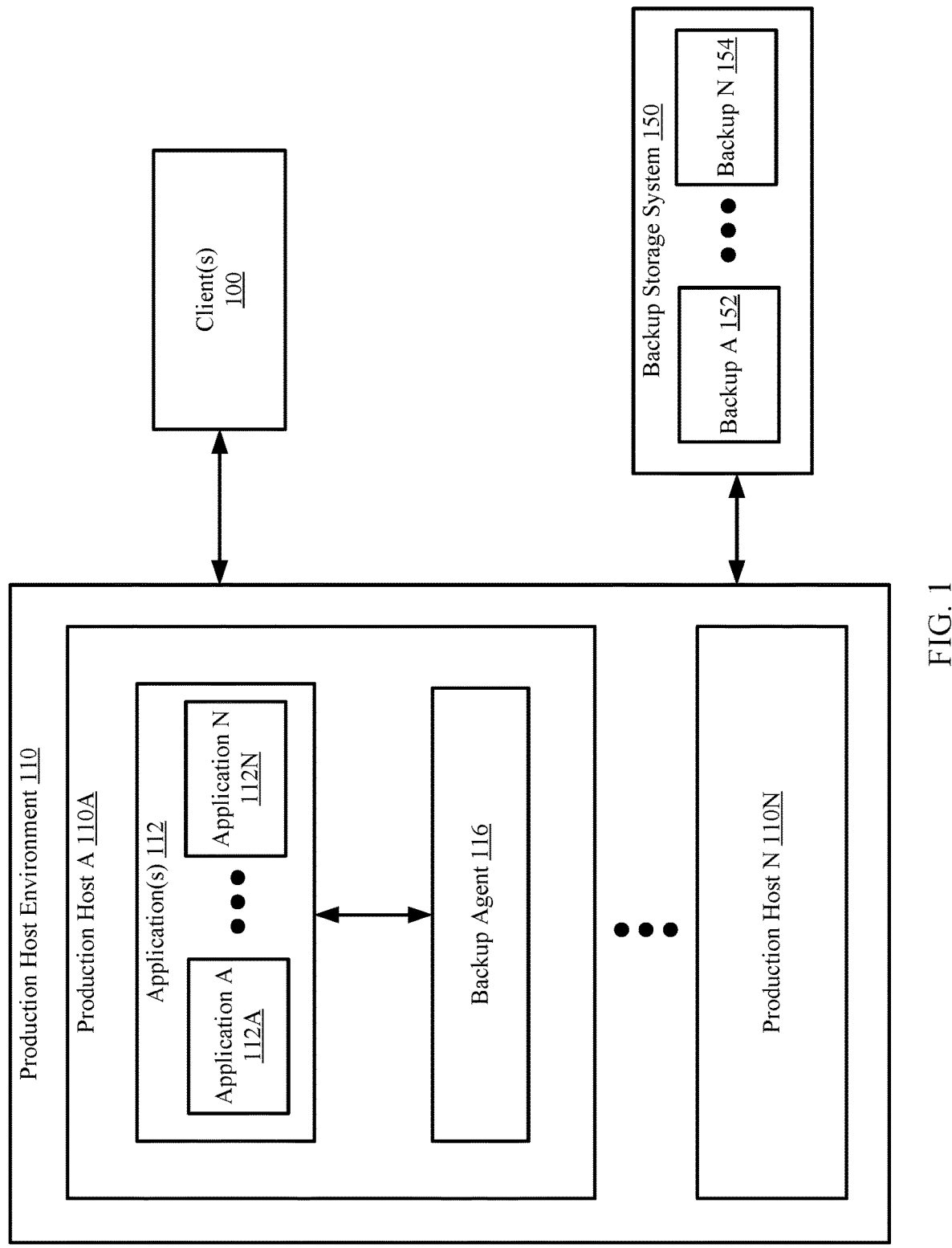
FIG. 1 shows a diagram of a system in accordance with one or more embodiments of the invention.

FIG. 1 shows a diagram of a system in accordance with one or more embodiments of the invention. The system may include one or more clients (100), a production host environment (110), and a backup storage system (150). The system may include additional, fewer, and/or different components without departing from the invention. Each component may be operably connected to any of the other components via any combination of wired and/or wireless connections. Each of the aforementioned components is discussed below.

In one or more embodiments of the invention, the production host environment (110) is a grouping of production hosts (110) that each provide services to the clients (100). Each production host (110A, 110N) in the production host environment (110) includes applications (112) and a backup agent (116). The production hosts (110A, 110N) may include additional, fewer, and/or different components without departing from the invention.

In one or more embodiments of the invention, a production host (110A, 110N) hosts one or more applications (112). In one or more embodiments of the invention, the applications (112) perform services for clients (e.g., 100). The services may include writing, reading, and/or otherwise modifying data that is stored in the production host (110A, 110N). The applications (112) may each include functionality for writing data to the production host (110A, 110N) and for notifying the persistent storage system write tracker (discussed below) of data written to the persistent storage system. The applications may be, for example, instances of databases, email servers, and/or other applications. The applications (112A, 112N) may host other types of applications without departing from the invention.

In one or more of embodiments of the invention, each application (112A, 112N) is implemented as computer instructions, e.g., computer code, stored on a persistent storage that when executed by a processor(s) of the production host (e.g., 110A, 110N) cause the production host (110A, 110N) to provide the functionality of the applications (e.g., 112A, 112N) described throughout this application.

In one or more embodiments of the invention, the production host (110A, 110N) further includes a backup agent (116). The backup agent (116) may include functionality for generating backups of a file system. In one or more embodiments of the invention, a file system is an organizational data structure that tracks how data is stored and retrieved in a system (e.g., in persistent storage of a production host (110A, 110N) or of the production host environment (110)). The file system may specify references to files and any data blocks associated with each file. Each data block may include a portion of application data (discussed in FIG. 2) for an application. The backup generated may include a copy of the data blocks for one or more specified applications associated with a specified point in time.

In one or more embodiments of the invention, the backup agent (116) may generate the backups based on backup policies implemented by the backup agent (116). The backup policies may specify a schedule in which the applications (e.g., 112A, 112N) are to be backed up. The backup agent (116) may be triggered to execute a backup in response to a backup policy. Alternatively, one or more of the backups (152, 154) may be generated in response to a backup request triggered by the client(s) (100). The backup request may specify the applications to be restored. The backup agent (116) may generate the backups via the method illustrated in FIG. 3A. The backup agent (116) may generate the backups via any other methods without departing from the invention.

In one or more embodiments of the invention, the backup agent (116) further includes functionality for restoring previously-backed up applications. The applications may be restored by generating application containers to be installed in, or otherwise transferred to, the production host environment (110). The backup agent (116) may perform the restorations via the method illustrated in FIG. 3B. The backup agent (116) may perform the restorations via any other methods without departing from the invention.

In one or more embodiments of the invention, the backup agent (116) is a physical device. The physical device may include circuitry. The physical device may be, for example, a field-programmable gate array, application specific integrated circuit, programmable processor, microcontroller, digital signal processor, or other hardware processor. The physical device may be adapted to provide the functionality of the backup agent (116) described throughout this application.

In one or more embodiments of the invention, the backup agent (116) is implemented as computer instructions, e.g., computer code, stored on a persistent storage that when executed by a processor of the production host (e.g., 110A, 110N) causes the production host (110A, 110N) to provide the functionality of the backup agent (116) described throughout this application.

Figure 5:
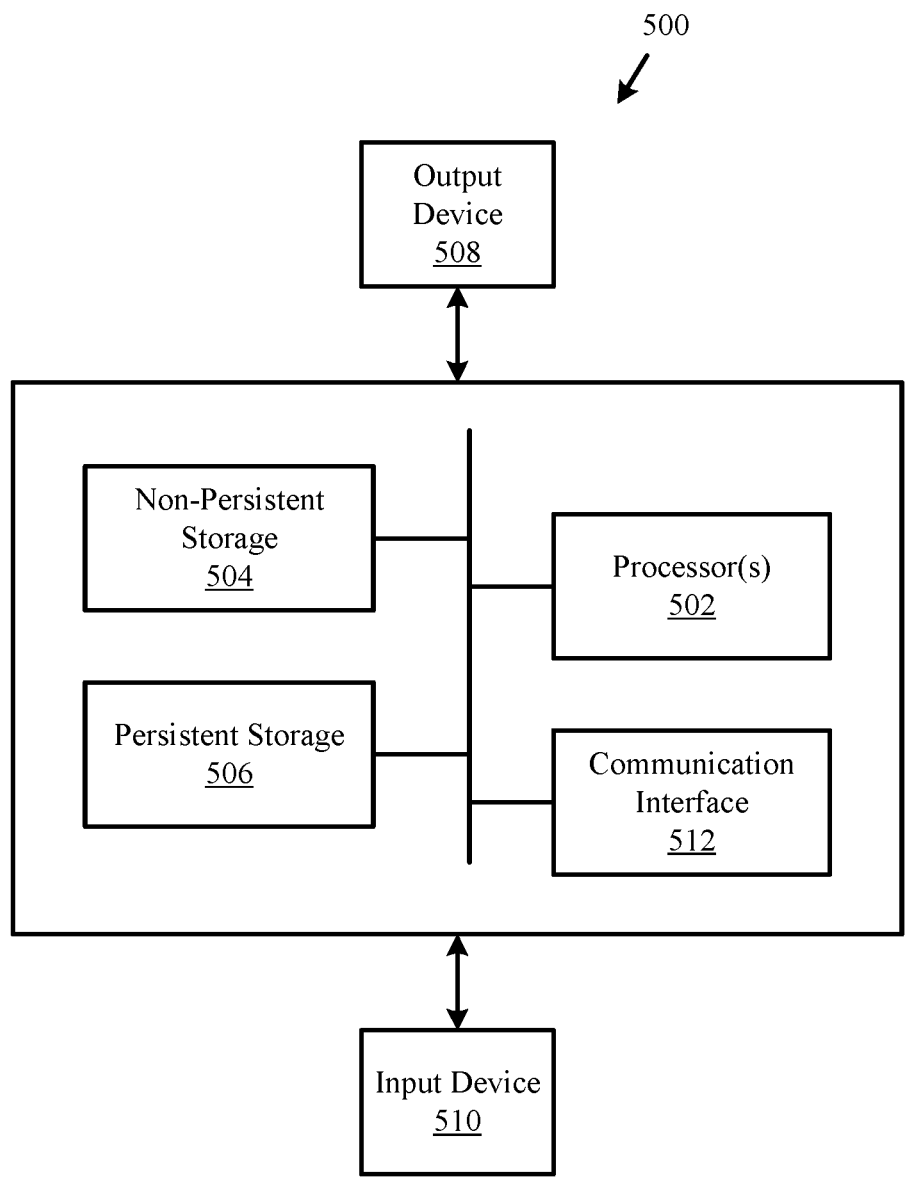
FIG. 5 shows a diagram of a computing device in accordance with one or more embodiments of the invention.

In one or more embodiments of the invention, the production host (110A, 110N) is implemented as a computing device (see e.g., FIG. 5). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the production host (110A, 110N) described throughout this application.

In one or more embodiments of the invention, the production host (110A, 110N) is implemented as a logical device. The logical device may utilize the computing resources of any number of computing devices and thereby provide the functionality of the production host (110A, 110N) described throughout this application.

In one or more embodiments of the invention, the client(s) (100) utilize services provided by the production host (110). Specifically, the client(s) (100) may utilize the applications in the applications (112A, 112N) to obtain, modify, and/or store data. The data may be generated from applications hosted in the application (112).

In one or more embodiments of the invention, a client (100) is implemented as a computing device (see e.g., FIG. 5). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the client (100) described throughout this application.

In one or more embodiments of the invention, the client(s) (100) are implemented as a logical device. The logical device may utilize the computing resources of any number of computing devices and thereby provide the functionality of the client(s) (100) described throughout this application.

In one or more embodiments of the invention, the backup storage system (150) stores backups of a file system. The file system may include application data of the applications (e.g., 112). The backups may further include application dependency information. In one or more embodiments of the invention, a backup is a full or partial copy of one or more applications (e.g., 112A, 112N). The copy may include the application data and/or application dependency information.

In one or more embodiments of the invention, a backup (152, 154) in the backup storage system (150) is divided into portions that are each dedicated to an application. The portions, also referred to as application partitions (discussed in FIG. 2) may be divided and organized such that the backup agent (116) may restore an application by identifying the application partition in the corresponding backup (152, 154) and utilizing the identified application partition in the restoration. The backups (152, 154) may include additional data (either generated by the backup agent (116) or another entity) without departing from the invention. For additional details regarding a backup (152, 154), see, e.g., FIG. 2.

In one or more embodiments of the invention, the backup storage system (150) is implemented as a computing device (see e.g., FIG. 5). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions stored on the persistent storage, that when executed by the processor(s) of the computing device cause the computing device to perform the functionality of the backup storage system (150) described throughout this application.

In one or more embodiments of the invention, the backup storage system (150) is implemented as a logical device. The logical device may utilize the computing resources of any number of computing devices and thereby provide the functionality of the backup storage system (150) described throughout this application.

Figure 2:
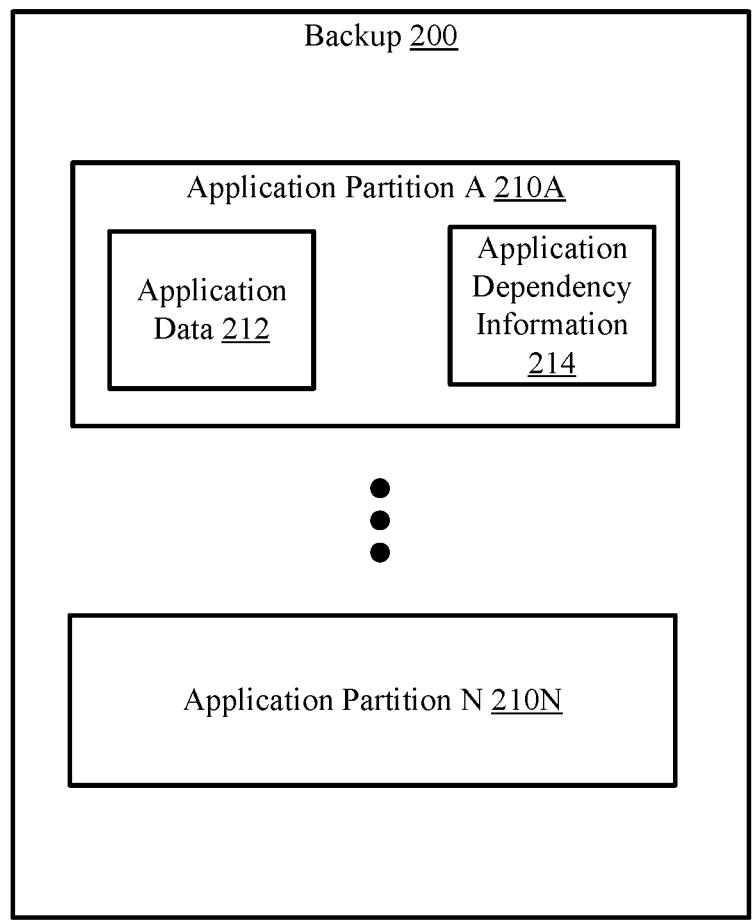
FIG. 2 shows a diagram of a backup in accordance with one or more embodiments of the invention.

FIG. 2 shows a diagram of a backup in accordance with one or more embodiments of the invention. The backup (200) may be an embodiment of a backup (152, 154) discussed above. In one or more embodiments of the invention, the backup (200) includes one or more application partitions (210A, 210N). Each application partition (210A, 210N) may include application data (e.g., 212) and application dependency information (214). The backup (200) may include additional, fewer, and/or different components without departing from the invention. Each of the aforementioned components illustrated in FIG. 2 is discussed below.

In one or more embodiments of the invention, each application partition (210A, 210N) is a portion of the backup (200) dedicated to an application. Each application partition (210A, 210N) may include application data (212) that includes data specified in a file system and is associated with the application. The application data may be data such as, for example, user information related to users (e.g, operating the clients (100, FIG. 1)), digital media stored for the users by the application, one or more databases, and/or other types of data without departing from the invention.

In one or more embodiments of the invention, the application partitions (210A, 210N) further include application dependency information (214). In one or more embodiments of the invention, the application dependency information (214) is additional data used to further enable an application to operate in a production host without requiring separate applications to be installed in the production host. The additional data may include, for example, a system database, configuration files, a secondary file system exclusively associated with the application, libraries used by the application, additional system information, and/or other additional data without departing from the invention. The additional data may be data that is not specified in a file system of a production host or a production host environment.

In one or more embodiments of the invention, the application dependency information further includes additional sub-applications that are required to be installed in order for the application to operate in a production host. The sub-applications may include the respective sub-application data and the respective system information (e.g., system databases, configuration files, etc.) used to install the sub-applications.

Figure 3A:
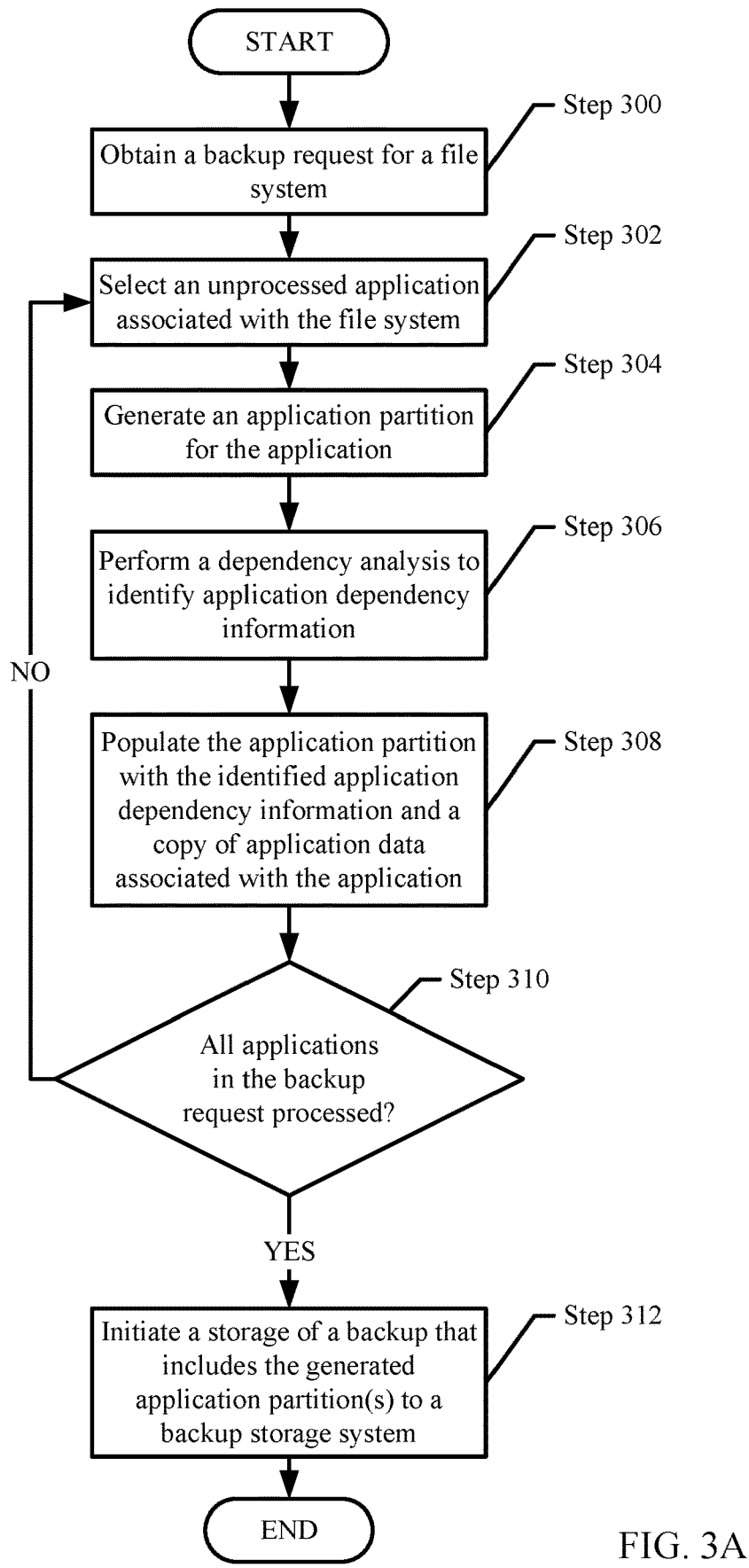
FIG. 3A shows a flowchart for performing a backup operation in accordance with one or more embodiments of the invention.
Figure 3B:
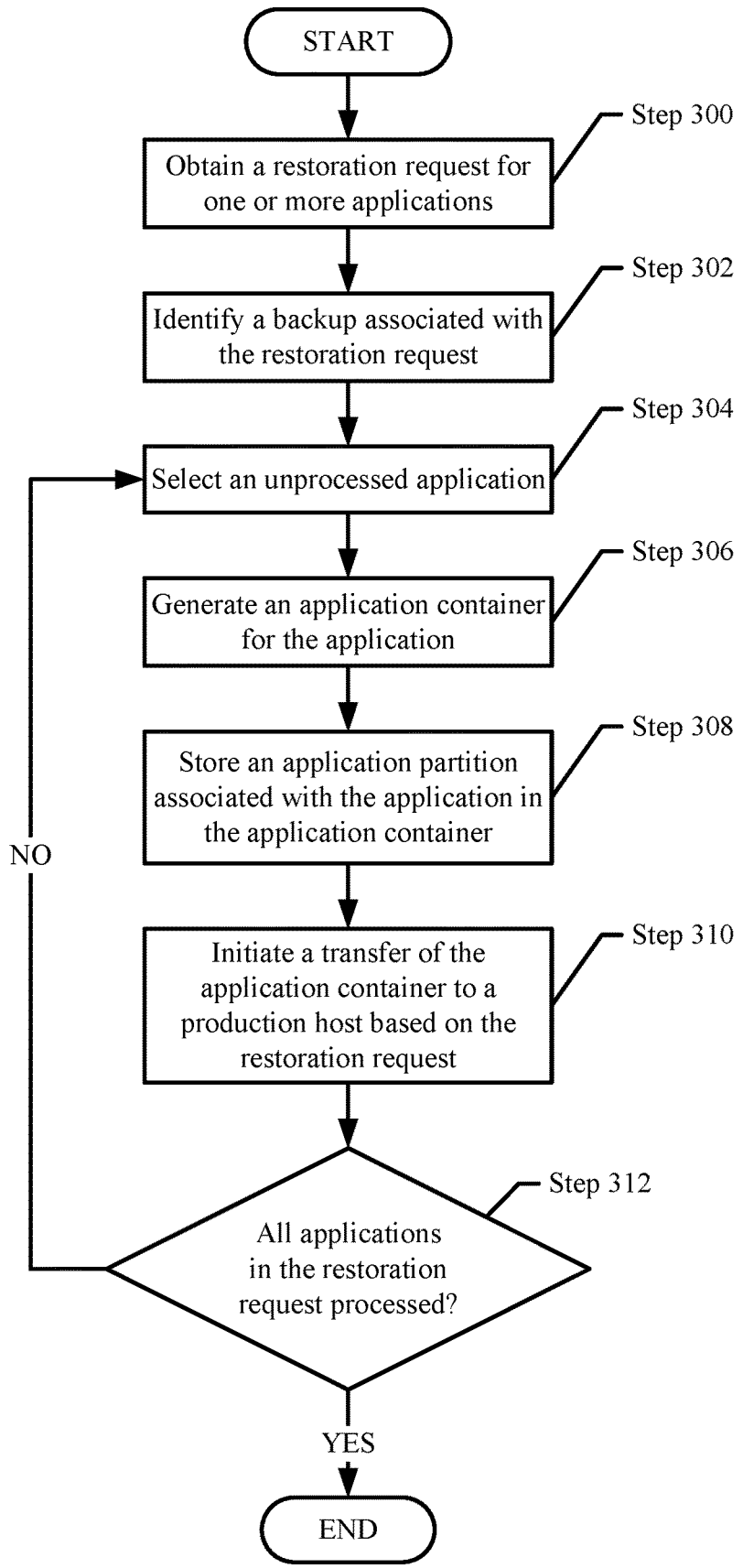
FIG. 3B shows a flowchart for restoring applications in accordance with one or more embodiments of the invention.

FIGS. 3A-3B show flowcharts in accordance with one or more embodiments of the invention. While the various steps in the flowcharts are presented and described sequentially, one of ordinary skill in the relevant art will appreciate that some or all of the steps may be executed in different orders, may be combined or omitted, and some or all steps may be executed in parallel. In one embodiment of the invention, the steps shown in FIGS. 3A-3B may be performed in parallel with any other steps shown in FIGS. 3A-3B without departing from the scope of the invention.

FIG. 3A shows a flowchart for performing a backup operation in accordance with one or more embodiments of the invention. The method shown in FIG. 3A may be performed by, for example, a backup agent (116A, FIG. 1). Other components of the system illustrated in FIG. 1 may perform the method of FIG. 3A without departing from the invention.

In step 300, a backup request for one or more applications is obtained. The backup request may be obtained from a client managing the initiation of backups. Alternatively, the backup request may be the result of the backup agent implementing backup policies. As discussed above, the backup policies may include schedules that specify when to perform a backup of the persistent storage device. The backup request may specify the applications to be backed up.

In step 302, an unprocessed application is selected. In one or more embodiments of the invention, the unprocessed application is an application that has not been processed via steps 304-308.

In step 304, an application partition is generated for the application. In one or more embodiments of the invention, the application partition is generated by separating a portion of a backup associated with the backup request to be dedicated to the selected application.

In step 306, a dependency analysis is performed on the application to identify application dependency information. In one or more embodiments of the invention, the dependency analysis includes analyzing the application to determine any databases, system files, and/or other additional data used by the application when executing on the production host.

In step 308, the application partition is populated with the identified application dependency information and a copy of application data associated with the application. In one or more embodiments of the invention, the application dependency information is copied and stored in the application partition. Further, a copy of all, or a portion thereof, of the application data generated by the application is stored in the application partition. In this manner, the application partition includes all the application data (or a copy thereof) and the application dependency information that may be used during a restoration of the application in any production host in the production host environment regardless of the current software installed in the production host.

In one or more embodiments of the invention, the selected application is marked as processed after steps 302-308 are performed for the selected application.

In step 310, a determination is made about whether all the applications specified in the backup request are processed. If all the applications specified in the backup request are processed, the method proceeds to step 312, otherwise, the method proceeds to step 302.

In step 312, following the determination that all applications have been processed, a storage of a backup that includes the generated application partition(s) to a backup storage system is initiated. In one or more embodiments of the invention, the backup agent initiates a transfer of the generated backup to the backup storage system. The backup may further include any metadata that enables the backup agent to identify the application partitions included in the backup (e.g., for the purposes of restoring the applications, as discussed in FIG. 3B).

FIG. 3B shows a flowchart for performing restorations of one or more applications in accordance with one or more embodiments of the invention. The method shown in FIG. 3B may be performed by, for example, a backup agent (116, FIG. 1). Other components of the system illustrated in FIG. 1 may perform the method of FIG. 3B without departing from the invention.

In step 300, a restoration request is obtained for one or more applications. The restoration request specifies the applications and a point in time in which to restore the application(s). In one or more embodiments of the invention, the restoration request may be obtained from a client that utilizes a user interface to enable a user (e.g., a person) to select the application(s) using the client. The user interface may be, for example, a graphical user interface (GUI), a command line interface (CLI), and/or any other type of interface without departing from the invention.

In step 302, a backup associated with the restoration request is identified. In one or more embodiments of the invention, the backup agent analyzes the backup storage system to identify one or more backups that include the application partition associated with the specified application(s) at the specified point in time.

In step 304, an unprocessed application is selected. The unprocessed application is an application specified in the restoration request that has not been processed via steps 306-310.

In step 306, an application container is generated for the application. In one or more embodiments of the invention, the application container is empty (i.e., no data is populated in the application container) at this point in time. In one or more embodiments of the invention, the application container is generated in the backup storage system. In such embodiments, the backup agent prompts the backup storage system (or a component of the backup storage system) to generate the application container.

In step 308, an application partition associated with the application is stored in the application container. In one or more embodiments of the invention, the application container is populated with the application partition stored in the identified backup. The application container may be populated by the backup agent or by the backup storage system as initiated by the backup agent.

In step 310, a transfer of the application container is initiated to a production host based on the restoration request. In one or more embodiments of the invention, the transfer includes prompting the backup storage system to transfer the application container to the production host specified in the restoration request. In this manner, the application container may be used to install the application in the production host, and the application data is restored to the specified point in time. The application data may be accessed by the production host without requiring the application to be previously installed in the production host.

In step 312, a determination is made about whether all applications specified in the restoration request are processed. If all applications specified in the restoration request are processed, the method ends following step 312; otherwise, the method proceeds to step 304.

Example

Figure 4A:
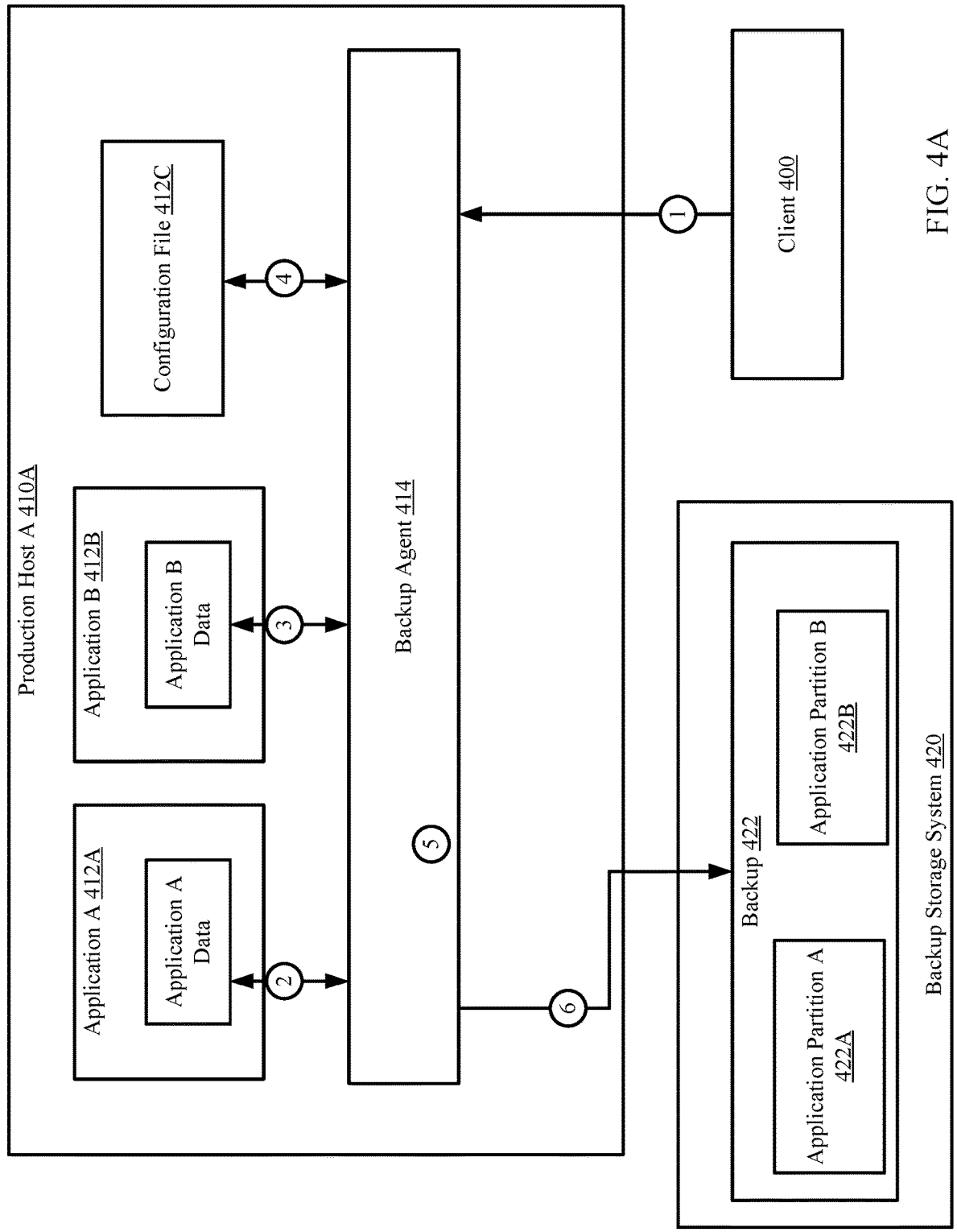
FIGS. 4A-4B show an example in accordance with one or more embodiments of the invention.
Figure 4B:
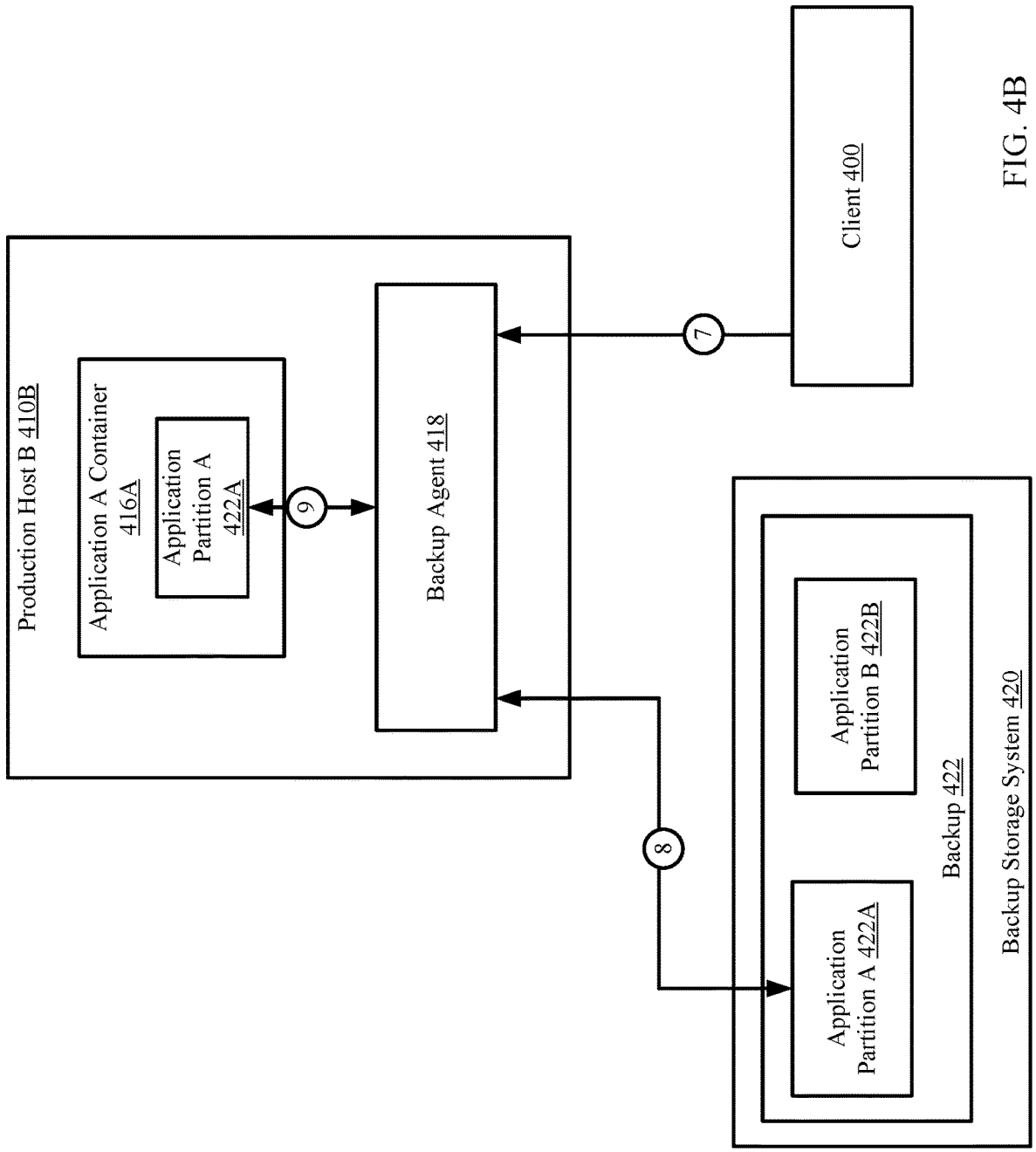

The following section describes an example. The example, illustrated in FIGS. 4A-4B, is not intended to limit the invention. Turning to the example, consider a scenario in which a production host hosts two applications storing data in a file system that is backed up periodically.

FIG. 4A shows a first diagram of the example system. For the sake of brevity, not all components of the example system are illustrated in FIG. 4A. The example system includes a production host A (410A), a client (400), and a backup storage system (420). The production host (410) includes application A (412A), application B (412B), a configuration file (412C) for which is used to enable operation of application A (412A) in the production host, and a backup agent (414).

The client (400) sends a backup request to the backup agent (414) that specifies backing up a file system that includes application data for applications A and B (412A, 412B) [1]. The backup agent (414), in response to the backup request, obtains application data for each application (412A, 412B) using the file system (not shown) in the production host [2, 3]. Further, the backup agent (414) performs a dependency analysis to determine that application A (412A) requires the configuration file (412C) installed in the production host (410A) in order for the applications (412A, 412B) to be executed in the production host (410A). Based on this determination, the backup agent (414) generates a copy of application dependency information for application A (412A) and a second copy for application B (412B). The application dependency information includes a copy of the configuration file (412C).

The backup agent (414) generates an application partition for each application [5]. Application partition A (422A) includes a copy of application A data and a copy of the configuration file (412C). Application partition B includes a copy of application B data and a second copy of the configuration file (412C). The backup agent (414) further generates a backup (422) in which the two application partitions (422A, 422B) are stored. The backup (422) is stored in the backup storage system (420) [6].

FIG. 4B shows a second diagram of the example system. For the sake of brevity, not all components of the example system are illustrated in FIG. 4B. At a later point in time, the client (400) sends a restoration request to a second backup agent (418) of a second production host (i.e., production host B (410B)) [1]. The restoration request specifies restoring the instance of application A backed up in FIG. 4A to production host B (410B).

The backup agent (418) performs the method of FIG. 3B to identify the backup (i.e., 422) associated with the instance of application A. The backup agent (418) further performs the method of FIG. 3B and obtains application partition A (422A) from the backup (422) using an application container in which the application partition is stored [8]. The application container (416A) is installed in production host B (410B) [9].

End of Example

As discussed above, embodiments of the invention may be implemented using computing devices. FIG. 5 shows a diagram of a computing device in accordance with one or more embodiments of the invention. The computing device (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), input devices (510), output devices (508), and numerous other elements (not shown) and functionalities. Each of these components is described below.

In one embodiment of the invention, the computer processor(s) (502) may be an integrated circuit for processing instructions. For example, the computer processor(s) may be one or more cores or micro-cores of a processor. The computing device (500) may also include one or more input devices (510), such as a touchscreen, keyboard, mouse, microphone, touchpad, electronic pen, or any other type of input device. Further, the communication interface (512) may include an integrated circuit for connecting the computing device (500) to a network (not shown) (e.g., a local area network (LAN), a wide area network (WAN) such as the Internet, mobile network, or any other type of network) and/or to another device, such as another computing device.

In one embodiment of the invention, the computing device (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing devices exist, and the aforementioned input and output device(s) may take other forms.

One or more embodiments of the invention may be implemented using instructions executed by one or more processors of the data management device. Further, such instructions may correspond to computer readable instructions that are stored on one or more non-transitory computer readable mediums.

One or more embodiments of the invention may improve the operation of one or more computing devices. More specifically, embodiments of the invention improve the backup and restoration of applications in a file system. Embodiments of the invention enable a file system backup to be performed for one or more applications including both the application data in the file system and all dependent data that enables the application to be executed on a production host. Embodiments of the invention remove the need to have configurations and/or applications pre-installed in the production host in order for the application to be restored in the production host. As such, embodiments of the invention increase the scope of computing devices in which applications may be restored and/or executing.

Thus, embodiments of the invention may address the problem of inefficient use of computing resources. This problem arises due to the technological nature of the environment in which backup operations are performed.

The problems discussed above should be understood as being examples of problems solved by embodiments of the invention disclosed herein and the invention should not be limited to solving the same/similar problems. The disclosed invention is broadly applicable to address a range of problems beyond those discussed herein.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A method for managing a persistent storage system, the method comprising:
    obtaining, by a backup agent, a backup request for a file system; and
    in response to the backup request:
        generating a first application partition for a first application;
        generating a second application partition for a second application, wherein the first and second applications are associated with the file system;
        performing a first dependency analysis on the first application to identify first application dependency information;
        performing a second dependency analysis on the second application to identify second application dependency information, wherein the first application dependency information comprises data to enable the first application to be, both, restored and operate, in a production host, without pre-installing, in the production host, other applications on which the first application depends;
        populating the first application partition with a copy of the first application dependency information and a copy of first application data associated with the first application;
        populating the second application partition with a copy of the second application dependency information and a copy of second application data associated with the second application;
        generating a backup comprising the first and second application partitions; and
        initiating a storage of the backup to a backup storage system.

2. The method of claim 1, further comprising:
    obtaining, by the backup agent, a restoration request for the second application; and
    in response to the restoration request:
        identifying the backup based on the restoration request;
        generating an application container for the second application;
        storing the second application partition in the application container; and
        after the storing, initiating a transfer of the application container to the production host based on the restoration request.

3. The method of claim 2, wherein the backup agent is operating in the production host.

4. The method of claim 2, wherein the backup agent is operatively connected to the production host.

5. The method of claim 1, wherein the first application dependency information and the second application dependency information are not specified in the file system.

6. A system, comprising:
a processor; and
memory comprising instructions which, when executed by the processor, perform a method, the method comprising:
obtaining, by a backup agent executing in the system, a backup request for a file system; and
in response to the backup request:
generating a first application partition for a first application;
generating a second application partition for a second application, wherein the first and second applications are associated with the file system;
performing a first dependency analysis on the first application to identify first application dependency information;
performing a second dependency analysis on the second application to identify second application dependency information, wherein the first application dependency information comprises data to enable the first application to be, both, restored and operate, in a production host, without pre-installing, in the production host, other applications on which the first application depends;
populating the first application partition with a copy of the first application dependency information and a copy of first application data associated with the first application;
populating the second application partition with a copy of the second application dependency information and a copy of second application data associated with the second application;
generating a backup comprising the first and second application partitions; and
initiating a storage of the backup to a backup storage system.

7. The system of claim 6, the method further comprising:
obtaining a restoration request for the second application; and
in response to the restoration request:
identifying the backup based on the restoration request;
generating an application container for the second application;
storing the second application partition in the application container; and
initiating a transfer of the application container to the production host based on the restoration request.

8. The system of claim 6, wherein the backup further comprises a third application partition generated and populated prior to generating the first and second application partitions in the backup, wherein the third application partition pertains to a third application associated with the file system, wherein the third application partition comprises a copy of third application dependency information and a copy of third application data associated with the third application.

9. The system of claim 6, wherein the first application data and the second application data are specified in the file system.

10. The system of claim 6, wherein the first application dependency information and the second application dependency information are not specified in the file system.

11. A non-transitory computer readable medium comprising computer readable program code, which when executed by a computer processor enables the computer processor to perform a method for performing a backup operation, the method comprising:
obtaining, by a backup agent, a backup request for a file system; and
in response to the backup request:
generating a first application partition for a first application;
generating a second application partition for a second application, wherein the first and second applications are associated with the file system;
performing a first dependency analysis on the first application to identify first application dependency information;
performing a second dependency analysis on the second application to identify second application dependency information, wherein the first application dependency information comprises data to enable the first application to be, both, restored and operate, in a production host, without pre-installing, in the production host, other applications on which the first application depends;
populating the first application partition with a copy of the first application dependency information and a copy of first application data associated with the first application;
populating the second application partition with a copy of the second application dependency information and a copy of second application data associated with the second application;
generating a backup comprising the first and second application partitions; and
initiating a storage of the backup to a backup storage system.

12. The non-transitory computer readable medium of claim 11, the method further comprising:
obtaining, by the backup agent, a restoration request for the second application; and
in response to the restoration request:
identifying the backup based on the restoration request;
generating an application container for the second application;
storing the second application partition in the application container; and
initiating a transfer of the application container to the production host based on the restoration request.

13. The non-transitory computer readable medium of claim 11, wherein the backup agent is operating in the production host.

14. The non-transitory computer readable medium of claim 11, wherein the backup agent is operatively connected to the production host.

15. The non-transitory computer readable medium of claim 11, wherein the first application dependency information and the second application dependency information are not specified in the file system.

* * * * *